US012186252B2

(12) United States Patent
Nomura et al.

(10) Patent No.: US 12,186,252 B2
(45) Date of Patent: Jan. 7, 2025

(54) ASSISTANCE DEVICE

(71) Applicant: FUJI CORPORATION, Aichi-ken (JP)

(72) Inventors: Hideaki Nomura, Toyota (JP); Ryu Takahashi, Toyota (JP)

(73) Assignee: FUJI CORPORATION, Aichi-ken (JP)

( * ) Notice: Subject to any disclaimer, the term of this patent is extended or adjusted under 35 U.S.C. 154(b) by 317 days.

(21) Appl. No.: 17/642,216

(22) PCT Filed: Sep. 12, 2019

(86) PCT No.: PCT/JP2019/035816
§ 371 (c)(1),
(2) Date: Mar. 10, 2022

(87) PCT Pub. No.: WO2021/048965
PCT Pub. Date: Mar. 18, 2021

(65) Prior Publication Data

US 2022/0313523 A1 Oct. 6, 2022

(51) Int. Cl.
*A61G 7/10* (2006.01)
*A61G 5/14* (2006.01)

(52) U.S. Cl.
CPC ............. *A61G 7/1046* (2013.01); *A61G 5/14* (2013.01); *A61G 7/1017* (2013.01); *A61G 2200/36* (2013.01)

(58) Field of Classification Search
CPC ...... A61G 7/1046; A61G 5/14; A61G 7/1017; A61G 2200/36; A61G 2200/52;
(Continued)

(56) References Cited

U.S. PATENT DOCUMENTS 4,809,804 A * 3/1989 Houston ................. B60L 1/003 297/DIG. 10
5,333,333 A * 8/1994 Mah ......................... A61H 3/04 280/30
(Continued)

FOREIGN PATENT DOCUMENTS

JP 2008073501 4/2008
JP 2014061448 A * 4/2014 ............... A61H 3/04
(Continued)

OTHER PUBLICATIONS

"International Search Report (Form PCT/ISA/210) of PCT/JP2019/035816," mailed on Oct. 15, 2019, with English translation thereof, pp. 1-4.

*Primary Examiner* — Justin C Mikowski
*Assistant Examiner* — Luke Hall
(74) *Attorney, Agent, or Firm* — JCIPRNET

(57) ABSTRACT

An assistance device that assists a care receiver in standing up, includes: a first arm extending upward from a base; a second arm provided on the first arm and swinging around a first_horizontal axis; a support member provided on the second arm; a first and second covers respectively provided on the first and second arms and covering at least a part of the first and second arms respectively; and a third cover configured to be swingable around a second horizontal axis is swingably attached to the first arm or the first cover and is slidably attached to the second arm or the second cover, alternatively the third cover is swingably attached to the second arm or the second cover and is slidably attached to the first arm or the first cover.

19 Claims, 8 Drawing Sheets

(58) Field of Classification Search
CPC .......... A61G 7/1096; A61G 5/10; A61H 3/04; A61H 2003/043
USPC .............................................................. 5/86.1
See application file for complete search history.

(56) References Cited

U.S. PATENT DOCUMENTS

| | | | | |
|---|---|---|---|---|
| 5,502,851 A * | 4/1996 | Costello | A61H 3/04 | 5/89.1 |
| 6,053,519 A * | 4/2000 | Poindexter | A61G 5/042 | 297/DIG. 10 |
| 6,231,067 B1 * | 5/2001 | Johnson | A61G 5/1091 | 180/907 |
| 6,389,619 B1 * | 5/2002 | Dunn | A61G 7/1096 | 5/81.1 R |
| 8,104,115 B2 * | 1/2012 | Gramkow | A61G 7/1015 | 5/83.1 |
| 8,104,835 B2 * | 1/2012 | Ovre | A61G 5/127 | 297/DIG. 10 |
| 8,156,586 B2 * | 4/2012 | Reed | A61G 1/0287 | 296/20 |
| 8,256,048 B2 * | 9/2012 | Bly | A61G 7/018 | 296/20 |
| 8,522,379 B2 * | 9/2013 | Turner | A61G 7/018 | 5/624 |
| 8,656,529 B2 * | 2/2014 | Corriveau | A61G 7/1046 | 5/83.1 |
| 8,701,229 B2 * | 4/2014 | Lemire | A61G 7/005 | 5/510 |
| 8,850,636 B2 * | 10/2014 | Gray | A61G 7/1098 | 5/81.1 R |
| 8,915,549 B2 * | 12/2014 | Addiego | A61G 5/14 | 5/81.1 R |
| 9,009,886 B2 * | 4/2015 | Hjort | A61G 7/1092 | 5/83.1 |
| 9,038,212 B2 * | 5/2015 | Yamaguchi | A61G 7/1046 | 5/87.1 |
| 9,050,225 B2 * | 6/2015 | Ooka | B62K 17/00 | |
| 10,076,845 B2 * | 9/2018 | Tsusaka | B25J 19/06 | |
| D849,608 S * | 5/2019 | Orrell | A61G 7/1096 | D12/131 |
| 11,202,730 B2 * | 12/2021 | Lingegard | A61G 7/1051 | |
| 2002/0153176 A1 * | 10/2002 | Downing | G01G 19/44 | 177/144 |
| 2011/0056019 A1 * | 3/2011 | Altena | A61G 7/1053 | 5/87.1 |
| 2012/0023661 A1 * | 2/2012 | Ota | A61H 1/001 | 414/921 |
| 2012/0198613 A1 * | 8/2012 | Jelinek | A61G 7/015 | 5/86.1 |
| 2012/0255118 A1 * | 10/2012 | Hammond | A61G 7/1096 | 5/86.1 |
| 2019/0247697 A1 * | 8/2019 | Park | A63B 21/4011 | |

FOREIGN PATENT DOCUMENTS

| | | | |
|---|---|---|---|
| JP | 2014124219 | 7/2014 | |
| JP | 2014124219 A * | 7/2014 | A61G 5/00 |
| JP | 2015536171 | 12/2015 | |
| JP | 2018102971 | 7/2018 | |
| WO | 2013051492 | 4/2013 | |
| WO | 2017199349 | 11/2017 | |
| WO | WO-2017199349 A1 * | 11/2017 | A61G 5/00 |
| WO | 2018168112 | 9/2018 | |
| WO | WO-2018168112 A1 * | 9/2018 | A61G 5/12 |

* cited by examiner

ASSISTANCE DEVICE

CROSS-REFERENCE TO RELATED APPLICATION

This application is a 371 application of the International PCT application serial no. PCT/JP2019/035816, filed on Sep. 12, 2019. The entirety of the above-mentioned patent application is hereby incorporated by reference herein and made a part of this specification.

TECHNICAL FIELD

The present specification relates to an assistance device that assists a care receiver in standing up.

BACKGROUND ART

The need for an assistance device has increased with the aging of society. Generally, the assistance device operates a support member that supports a part of a body of a care receiver to perform assistance. The introduction of the assistance device reduces the physical burden on caregivers and care receivers and also mitigates the shortage of caregivers. As an example of the assistance device, there is a device that assists the care receiver in standing up from the sitting posture. One example of technology related to this type of assistance device is disclosed in Patent Literature 1.

Patent Literature 1 discloses an assistance device including a holding member that is supported by a swinging arm member to swing and a cover that covers a swing mechanism section. In the assistance device, the swinging arm member moves an opening portion of the cover, and the opening portion is closed by a slide sheet (closing member). With this, it is safe because the body, clothes, or the like of the care receiver is not pinched in the opening portion.

PATENT LITERATURE

Patent Literature 1: International Publication No. WO2017/199349

SUMMARY OF THE INVENTION

Technical Problem

Incidentally, since not only Patent Literature 1 but also the assistance device generally has a movable portion and the shape thereof is changed, it is difficult to cover the entire device with one cover. If the entire device is covered with one cover, the cover may be unnecessarily increased in size to easily interfere with the care receiver, or an assistance device main body may be increased in size and weight. Alternatively, in a case where a configuration in which multiple covers are combined in order to restrain the increase in size is employed, a gap may be generated between the covers or the separation distance between the covers may be changed, due to a shape change of the assistance device. For this reason, there is a concern that the finger or the like of the care receiver may reach the movable portion through the gap and be pinched in the movable portion or may be pinched between the covers.

In the present specification, an object to be achieved is to provide an assistance device having a cover configuration that eliminates a concern that the finger or the like of a care receiver is pinched while restraining the increase in size of an assistance device main body and a cover.

Solution to Problem

The present specification discloses an assistance device that assists a care receiver in standing up, the device including: base; a first arm extending upward from the base; a second arm provided on the first arm and configured to swing around a horizontal axis; a support member provided on the second arm and configured to support an upper half body of the care receiver; a first cover provided on the first arm and configured to cover at least a part of the first arm; a second cover provided on the second arm and configured to cover at least a part of the second arm; and a third cover supported, when the first arm or the first cover is defined as a first member and the second arm or the second cover is defined as a second member, so as to be swingable around a horizontal axis with respect to a first one of the first and second members and provided so as to be slidably movable with respect to a second one of the first and second members.

Advantageous Effect of the Invention

The assistance device disclosed in the present specification includes the third cover in addition to the first cover configured to cover the first arm and the second cover configured to cover the second arm. Therefore, a gap between the first and second covers can be closed by the third cover even in a case where the second arm swings with respect to the first arm and the gap is generated. Accordingly, the gap is substantially eliminated, so that there is no concern that the finger or the like of the care receiver is pinched in the movable portion or between the covers. In addition, with the combination of three covers, a compact cover configuration capable of responding to the shape change of the assistance device is realized, and the increase in size of an assistance device main body and the cover is restrained.

DESCRIPTION OF EMBODIMENTS

Figure 1:
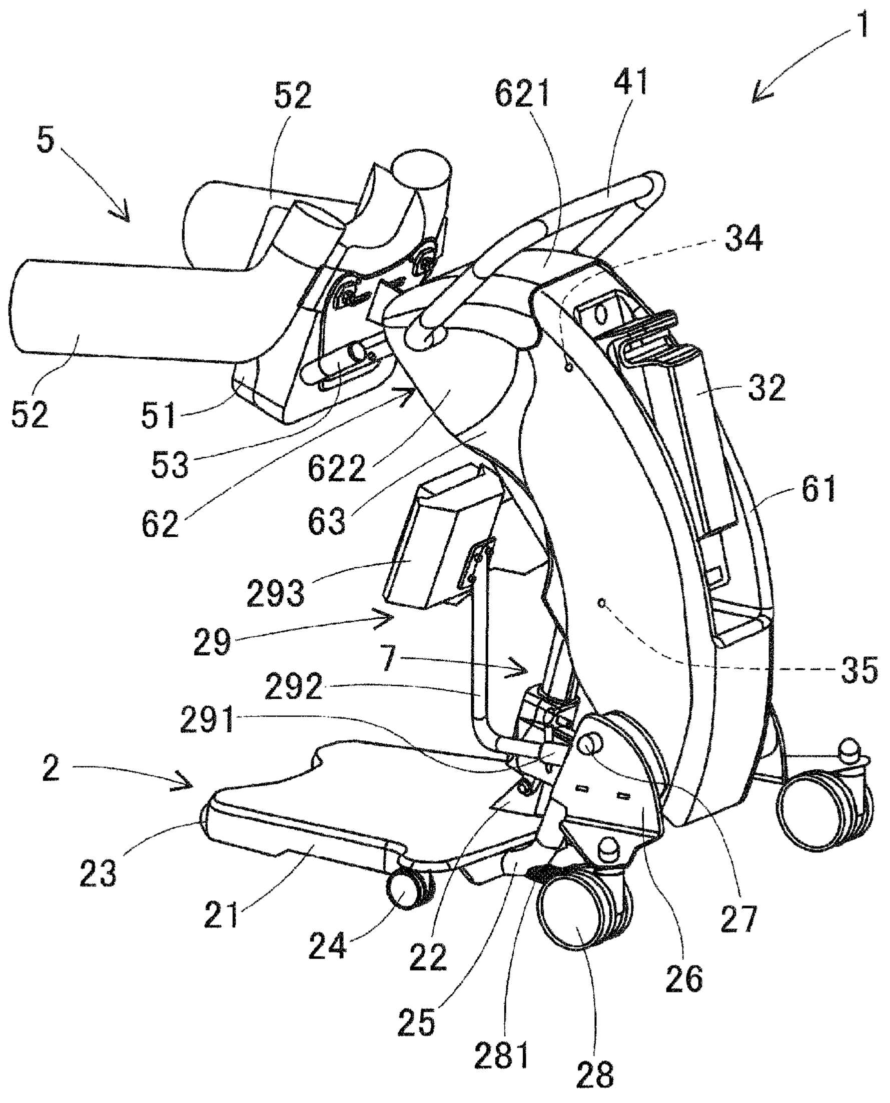
FIG. 1 is a perspective view of an assistance device of a first embodiment as viewed obliquely from a front right side.

1. Configuration of Assistance Device 1 of First Embodiment

The configuration of assistance device 1 of a first embodiment will be described with reference to FIGS. 1 to 8. Assistance device 1 is used, for example, for transfer between two different places, such as transfer between a bed and a wheelchair of a care receiver, and transfer between a wheelchair and a toilet seat. Assistance device 1 supports the upper body of the care receiver to assist the care receiver in standing up from the sitting posture to the stand-up posture and in sitting down from the stand-up posture to the sitting posture.

Here, the sitting posture means a posture in which the care receiver is seated on a seat surface such as a chair. The stand-up posture means a posture in which the buttocks of the care receiver float from the seat surface and the legs are stretched, and includes the standing posture and the half-sitting posture. That is, the stand-up posture includes the standing posture in which the upper body is substantially upright, a stooped posture of half-sitting in which the upper body leans forward, and the like. In addition, the intermediate posture means a transitional posture between the sitting posture and the stand-up posture. Assistance device 1 can transport the care receiver with the stand-up posture in a case where two places from and to which transfer is made are separated from each other. Assistance device 1 is formed of base 2, first arm 3, second arm 4, support member 5, first cover 61, second cover 62, third cover 63, driving source 7, actuator 8, and the like.

Base 2 is formed of footrest 21, base rod 25, attachment plate 26, knee rest member 29, and the like. Footrest 21 is substantially horizontally disposed near floor surface F. Footrest 21 is a portion on which the care receiver places his/her feet. Base point 22 that is used to attach driving source 7 is provided upward on the front side of an upper surface of footrest 21. A pair of right and left rear wheels 23 are provided on the right and left of a rear part of a lower surface of footrest 21. A pair of right and left middle wheels 24 are provided on the right and left on the front side of the lower surface of footrest 21.

A pair of right and left base rods 25 are provided on the front right and left sides of footrest 21. Base rod 25 extends forward and is bent diagonally forward and upward. A pair of right and left attachment plates 26 are each provided on the bent upper part of base rod 25. Arm supporting seats 27 are each provided on an upper part of attachment plate 26. A pair of right and left front wheels 28 are each provided on the front outer side of a lower part of the attachment plate 26. Front wheel 28 has a larger diameter than that of each of middle wheel 24 and rear wheel 23. With steering functions of front wheel 28, middle wheel 24, and rear wheel 23, assistance device 1 can perform not only straight-ahead movement and revolving movement but also sideways movement and spin turn. Front wheel 28 further includes lock mechanism 281 that restricts the movement.

Knee rest member 29 is attached to the pair of right and left attachment plates 26. Knee rest member 29 includes a pair of right and left position adjustment portions 291 and support rods 292, and knee rest body members 293. Position adjustment portion 291 is a manual adjustment mechanism that adjusts the position of knee rest body member 293 in a rear-front direction such that the physique and the sitting posture of the care receiver are compatible with knee rest body member 293. Position adjustment portion 291 is provided on the attachment plate 26 and extends in a rear-front direction. Support rod 292 is supported by position adjustment portion 291 and the position thereof in a rear-front direction is adjusted. Support rod 292 extends rearward and is bent upward in the middle.

Knee rest body members 293 are attached to upper ends of a pair of right and left support rods 292. Knee rest body member 293 is formed of a base plate and a buffer member. The base plate is fixed to support rod 292 and extends in a right-left direction, and both right and left sides thereof are bent diagonally rearward. The buffer member is affixed to a rear surface of the base plate. Knee rest body member 293 is a member which comes into contact with the knee of the care receiver. The position of the knee determined by the knee rest body member 293 enables the care receiver to stand up or sit down stably.

Figure 3:
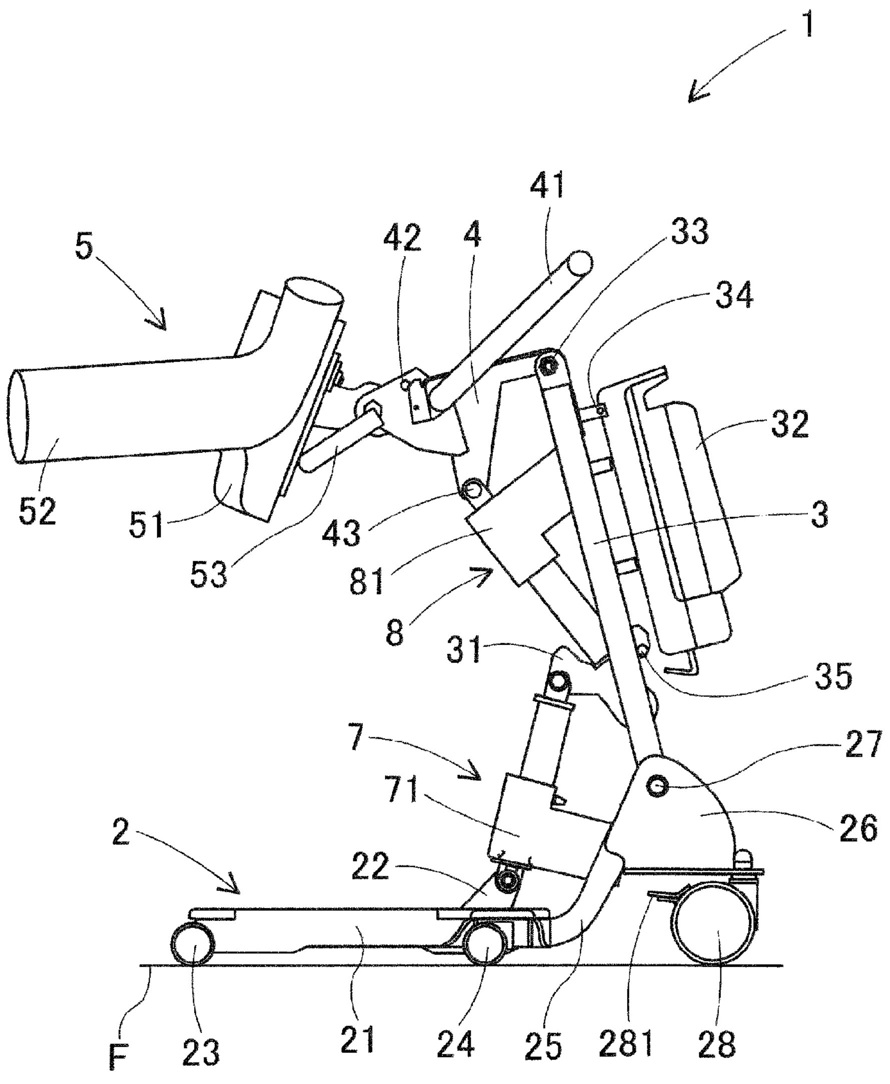
FIG. 3 is a side view in which first to third covers and a knee rest member are omitted from FIG. 2.
Figure 5:
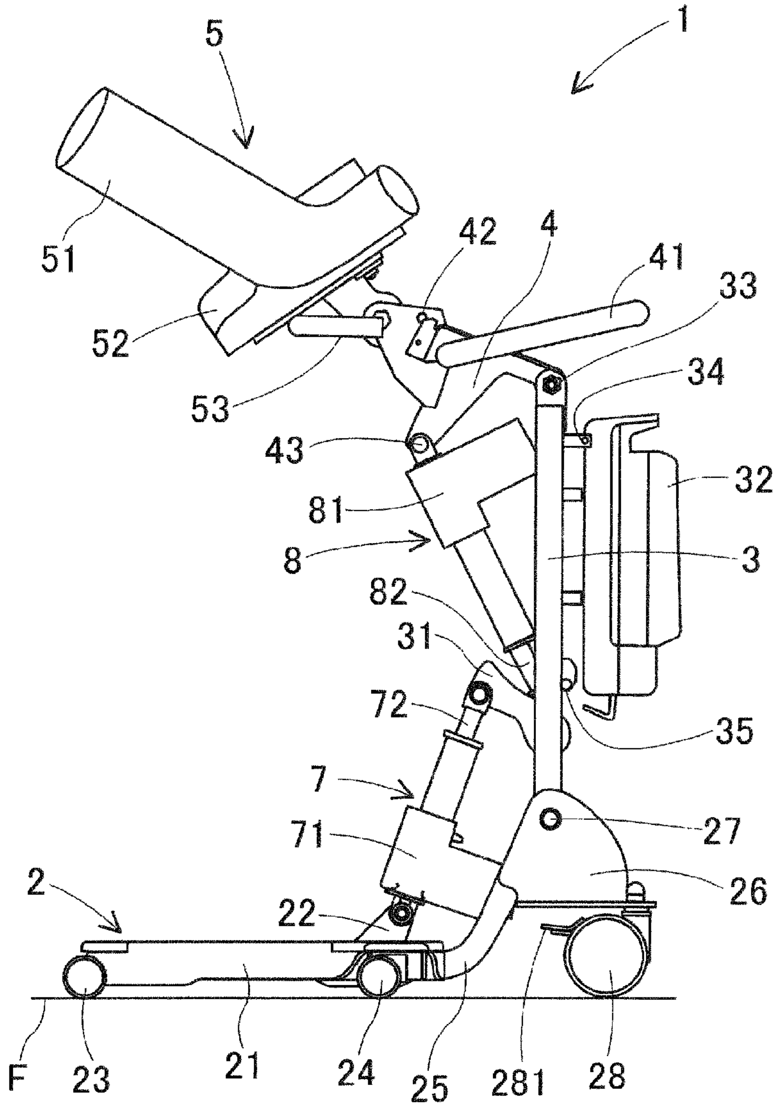
FIG. 5 is a side view in which the first to third covers and the knee rest member are omitted from FIG. 4.
Figure 7:
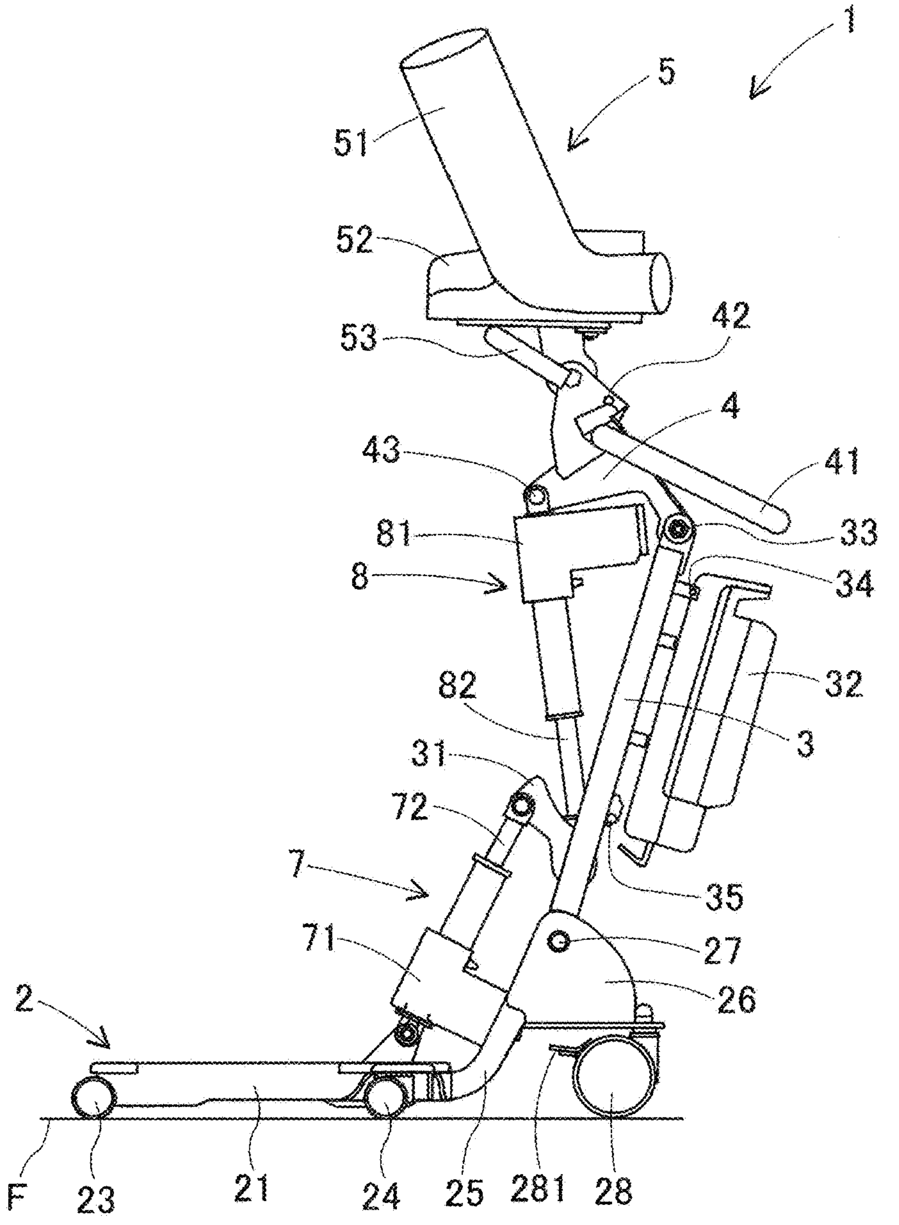
FIG. 7 is a side view in which the first to third covers and the knee rest member are omitted from FIG. 6.

First arm 3 and second arm 4 are shown in FIGS. 3, 5, and 7. First arm 3 is formed by coupling a pair of right and left arm members. First arm 3 is provided so as to be swingable around a horizontal axis with respect to right and left arm supporting seats 27 of base 2. First arm 3 extends upward from arm supporting seat 27. Auxiliary member 31 is provided on a rear lower part of first arm 3. Auxiliary member 31 serves as a drive point to which driving source 7 is attached and a base point to which actuator 8 is attached.

Battery 32 is provided on the front side of first arm 3. Battery 32 is a power source for driving source 7, actuator 8, and a control section (not shown). An upper end of first arm 3 is supporting end 33 that supports second arm 4 swingably. Upper cover supporting pin 34 is provided outward in the right-left direction from an upper part of first arm 3. Lower cover supporting pin 35 is provided outward in the right-left direction from a lower part of first arm 3. First cover 61 is attached to upper cover supporting pin 34 and lower cover supporting pin 35.

Second arm 4 is provided so as to be swingable around a horizontal axis with respect to supporting end 33 of first arm 3. Second arm 4 extends rearward from supporting end 33. Second arm 4 has first handle 41 having a substantially rectangular frame shape. First handle 41 is disposed so as to extend in a front-up direction from a rear part of second arm 4. A side part of first handle 41 is gripped by the care receiver and is used to stabilize the posture. A front part of first handle 41 is gripped by the caregiver and is used to move assistance device 1.

Cover supporting pin 42 is provided outward in the right-left direction from a position close to the root of first handle 41 of a side surface of second arm 4. Second cover 62 is attached to cover supporting pin 42. Shaft member 43 corresponding to a drive point to which actuator 8 is attached is provided on a lower part of second arm 4. Shaft member 43 extends in the right-left direction, and third cover 63 is supported by shaft member 43 so as to be swingable around a horizontal axis.

Support member 5 is attached to a rear end of second arm 4. Support member 5 is supported so as to be freely tiltable in a front-up direction from a rear-down direction with respect to second arm 4. The term “free tilting” means tilting that can be manually moved, not tilting driven by an actuator or the like. Support member 5 has trunk support portion 51, a pair of side support portions 52, and second handle 53.

Trunk support portion 51 is formed by affixing a buffer material that is flexibly deformed, to a rear surface of a base plate. Trunk support portion 51 has a surface shape close to a front surface of the trunk of the upper half body of the care receiver, and supports the trunk of the care receiver by surface contact. The pair of side support portions 52 are provided on the right and left of trunk support portion 51. Side support portion 52 is formed such that a core material is bent in an L-shape, and is covered with a buffer material that is flexibly deformed. Side support portions 52 support both sides of the care receiver.

Trunk support portion 51 has second handle 53 on the front side. Second handle 53 has a base shaft portion fixed to trunk support portion 51 and extending in the right-left direction, and gripping portions extending in a front-up direction from both ends of the base shaft portion. Second handle 53 is gripped by the caregiver and is used to move assistance device 1. Second handle 53 freely tilts integrally with trunk support portion 51.

Driving source 7 is provided behind first arm 3. Specifically, driving source 7 is bridged between base point 22 of base 2 and auxiliary member 31 (drive point) of first arm 3. Driving source 7 is a linear motion actuator formed of main body portion 71 and expansion and contraction portion 72 expanding and contracting from main body portion 71. Main body portion 71 is rotatably coupled relative to base point 22 and swings in the rear-front direction. A tip of expansion and contraction portion 72 is rotatably coupled relative to auxiliary member 31. Driving source 7 expands and contracts to drive first arm 3 to swing with respect to base 2. It should be noted that the positional relationship between main body portion 71 and expansion and contraction portion 72 may be reversed.

Actuator 8 is provided at a position behind first arm 3 and below second arm 4. Specifically, actuator 8 is bridged between auxiliary member 31 (base point) of first arm 3 and shaft member 43 (drive point) of second arm 4. Actuator 8 is a linear motion actuator formed of main body portion 81 and expansion and contraction portion 82 expanding and contracting from main body portion 81. Main body portion 81 is rotatably coupled relative to shaft member 43. A tip of expansion and contraction portion 82 is rotatably coupled relative to auxiliary member 31. Actuator 8 expands and contracts to drive second arm 4 to swing with respect to first arm 3. It should be noted that the positional relationship between main body portion 81 and expansion and contraction portion 82 may be reversed.

As described above, first arm 3 and second arm 4 form an operation mechanism having two joints with respect to base 2. First arm 3 swings forward about arm supporting seat 27 of base 2 in response to the lengthening operation of driving source 7. Further, first arm 3 swings rearward in response to the shortening operation of driving source 7. Second arm 4 and support member 5 swing in the front-up direction around supporting end 33 of first arm 3 in response to the lengthening operation of actuator 8. Further, second arm 4 and support member 5 swing in the rear-down direction in response to the shortening operation of actuator 8. Driving source 7 and actuator 8 are cooperatively controlled from a control section (not shown).

Figure 2:
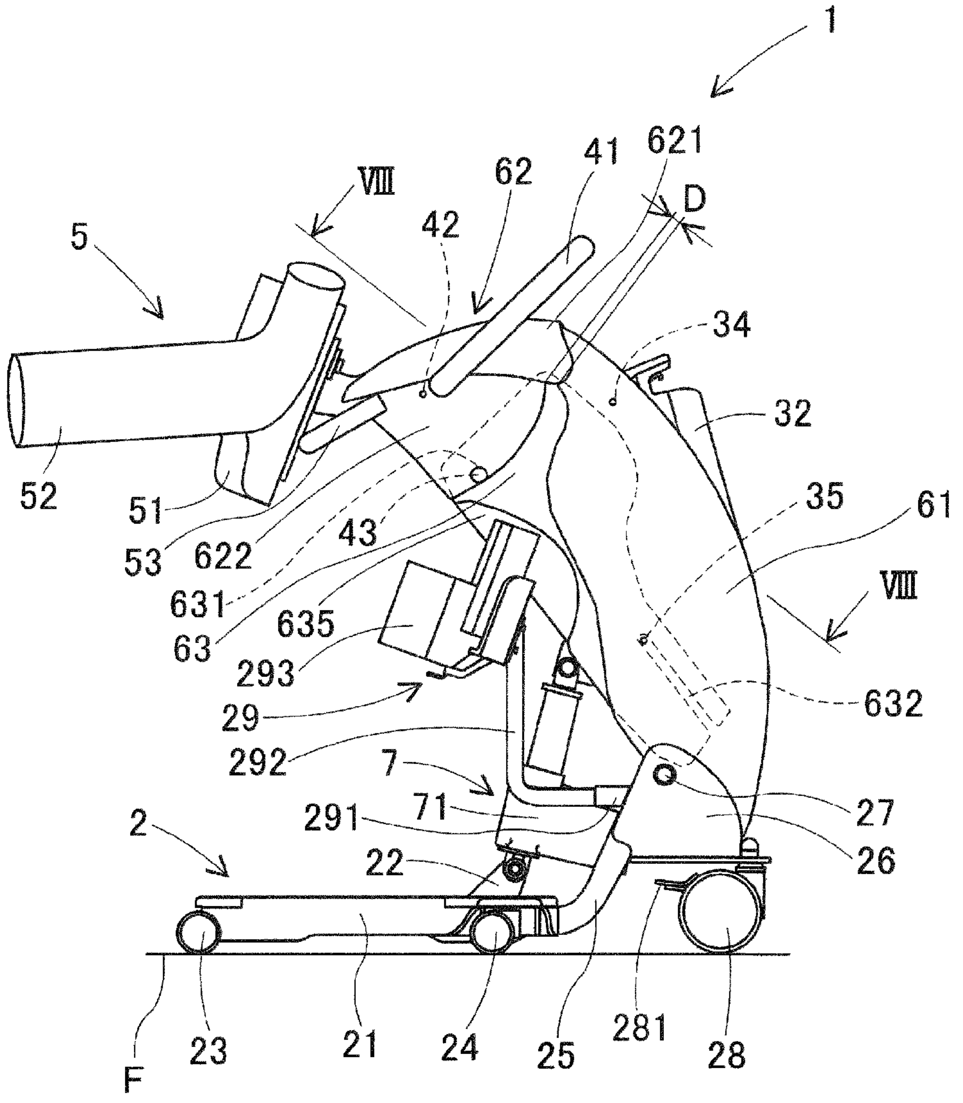
FIG. 2 is a side view showing the assistance device in an initial state in which a care receiver with a sitting posture is supported.

In assistance device 1 in an initial state shown in FIGS. 2 and 3, driving source 7 and actuator 8 are in the shortest state. When driving source 7 and actuator 8 are lengthened halfway from this state, assistance device 1 transitions to the intermediate support state shown in FIGS. 4 and 5. Further, when driving source 7 and actuator 8 are lengthened to the end, assistance device 1 transitions to the standing support state shown in FIGS. 6 and 7. As a result, assistance device 1 can assist the care receiver in standing up. In addition, assistance device 1 assists the care receiver in sitting down in response to the shortening operation of driving source 7 and actuator 8.

2. Cover Configuration of First Embodiment

Next, a cover configuration including first cover 61, second cover 62, and third cover 63 will be described in detail with reference to FIGS. 2, 4, and 6. First cover 61, second cover 62, and third cover 63 are produced by bending processing and cutting processing of a resin plate or a metal plate, resin molding, or the like.

First cover 61 is formed in a shape that covers the front side and the right and left side parts of first arm 3. First cover 61 is attached to the outer side of upper cover supporting pin 34 and lower cover supporting pin 35 of first arm 3. First cover 61 swings integrally with first arm 3 with respect to base 2, with the swing of first arm 3.

Further, first cover 61 is disposed so as to pass between first arm 3 and battery 32 in the right-left direction. In the manufacturing step of assistance device 1, the attaching order of first cover 61 and battery 32 is not limited. That is, first cover 61 may be attached first, and battery 32 may be attached later, with respect to first arm 3. Alternatively, first cover 61 to which battery 32 has been attached may be attached to first arm 3.

Second cover 62 is formed in a shape that covers the upper side, the right and left side parts, and a part of the lower side of second arm 4. Second cover 62 includes upper cover portion 621 and lower cover portion 622. Upper cover portion 621 mainly covers the upper side of second arm 4. Lower cover portion 622 mainly covers the right and left side parts and a part of the lower side of second arm 4. An upper edge of lower cover portion 622 is coupled to an inner surface side of a lower edge of upper cover portion 621.

Second cover 62 is attached to the outer side of cover supporting pin 42 of second arm 4. In the attachment state, upper cover portion 621 overlaps with the outer side of an upper end of first cover 61. At a position in which upper cover portion 621 and first cover 61 overlap with each other, a gap is hardly generated or the covers come into contact with each other. Accordingly, there is no concern that the finger or the like of the care receiver is pinched in this position. Meanwhile, lower cover portion 622 is spaced rearward of first cover 61. That is, a gap with which lower cover portion 622 and first cover 61 are spaced in the rear-front direction is formed therebetween.

Second cover 62 swings integrally with second arm 4 with respect to first arm 3, with the swing of second arm 4. Accordingly, second cover 62 is displaced relative to first cover 61. Here, first cover 61 and second cover 62 come closest to each other in the initial state shown in FIG. 2, with the swing of second arm 4. At this time, the separation distance D of the gap between first cover 61 and lower cover portion 622 is a minimum value. In addition, the separation distance D is secured to be a specified value or more in which the finger is not pinched. Accordingly, there is no concern that the finger or the like of the care receiver is pinched in this position.

Third cover 63 is formed in a shape that covers the rear side of first arm 3, actuator 8, and the remainder of the lower side of second arm 4. In addition, third cover 63 is formed in a shape that closes the gap between first cover 61 and lower cover portion 622. In FIGS. 2, 4, and 6, the outer shape of third cover 63 is indicated by solid lines and broken lines. Recessed portion 635 that is used to avoid knee rest member 29 is formed on a rear part of third cover 63.

Attachment hole 631 is formed on an upper part of a side surface of third cover 63. Shaft member 43 of second arm 4 is fitted into attachment hole 631. With this, third cover 63 is supported so as to be swingable around a horizontal axis passing through shaft member 43 with respect to second arm 4. It should be noted that shaft member 43 may be a separate member different from the base point to which actuator 8 is attached. In the first embodiment, shaft member 43 that supports third cover 63 swingably also serves as the base point to which actuator 8 is attached. Accordingly, the number of components is reduced.

Guide groove 632 is formed on a lower part of a side surface of third cover 63. The direction in which guide groove 632 is formed is determined such that the slide movement direction of third cover 63 is along the expansion and contraction direction of actuator 8. Specifically, guide groove 632 is formed in a straight line shape in parallel with the rear surface of third cover 63, and is opened toward a lower edge. It should be noted that guide groove 632 may be formed in a curved shape along the expansion and contraction direction of actuator 8. With the shape of guide groove 632 optimized, a rearward movement distance of third cover 63 can be minimized.

Lower cover supporting pin 35 provided outward from first arm 3 is engaged in guide groove 632. Lower cover supporting pin 35 serves as a guide pin that slides inside guide groove 632. With this, third cover 63 is supported so as to be slidably movable with respect to first arm 3. It should be noted that the guide pin that slides in guide groove 632 may be a separate member different from lower cover supporting pin 35. In the first embodiment, lower cover supporting pin 35 to which first cover 61 is attached also serves as the guide pin that slides in guide groove 632 of third cover 63. Accordingly, the number of components is reduced.

Figure 8:
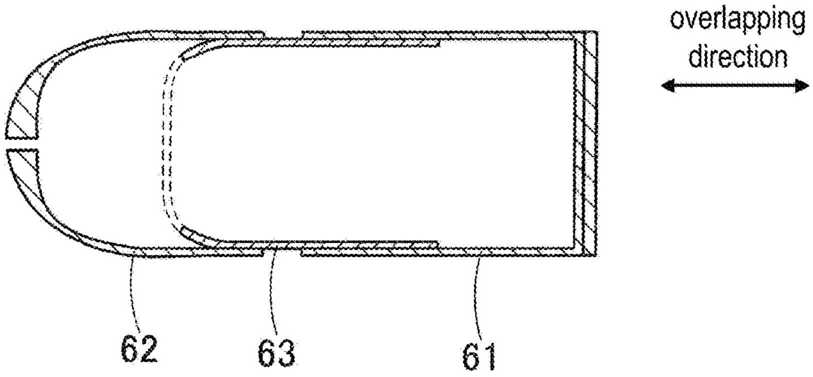
FIG. 8 is a cross-sectional view taken along line VIII-VIII in FIG. 2, which shows an overlapping status of the three covers.

As shown in FIG. 8, third cover 63 is disposed on the inner surface side of first cover 61 and second cover 62. At a position in which third cover 63 and first cover 61 overlap with each other and a position in which third cover 63 and second cover 62 overlap with each other, a gap is hardly generated or the covers come into contact with each other. Accordingly, there is no concern that the finger or the like of the care receiver is pinched in this position. It should be noted that the overlapping status in which the three covers overlap with each other on the inside and outside may be appropriately changed in consideration of prevention of dust accumulation, simplification of the maintenance of assistance device 1, ease of production, and the like.

As shown in FIG. 2, in assistance device 1 in the initial state in which the care receiver with the sitting posture is supported, third cover 63 is disposed so as to close the gap of the separation distance D between first cover 61 and second cover 62. At this time, lower cover supporting pin 35 is positioned at a substantially deepest part of guide groove 632. First cover 61 and third cover 63 partially overlap with each other, so that a gap is not generated in a direction orthogonal to the overlapping direction. Further, second cover 62 and third cover 63 partially overlap with each other, so that a gap is not generated in a direction orthogonal to the overlapping direction.

Figure 4:
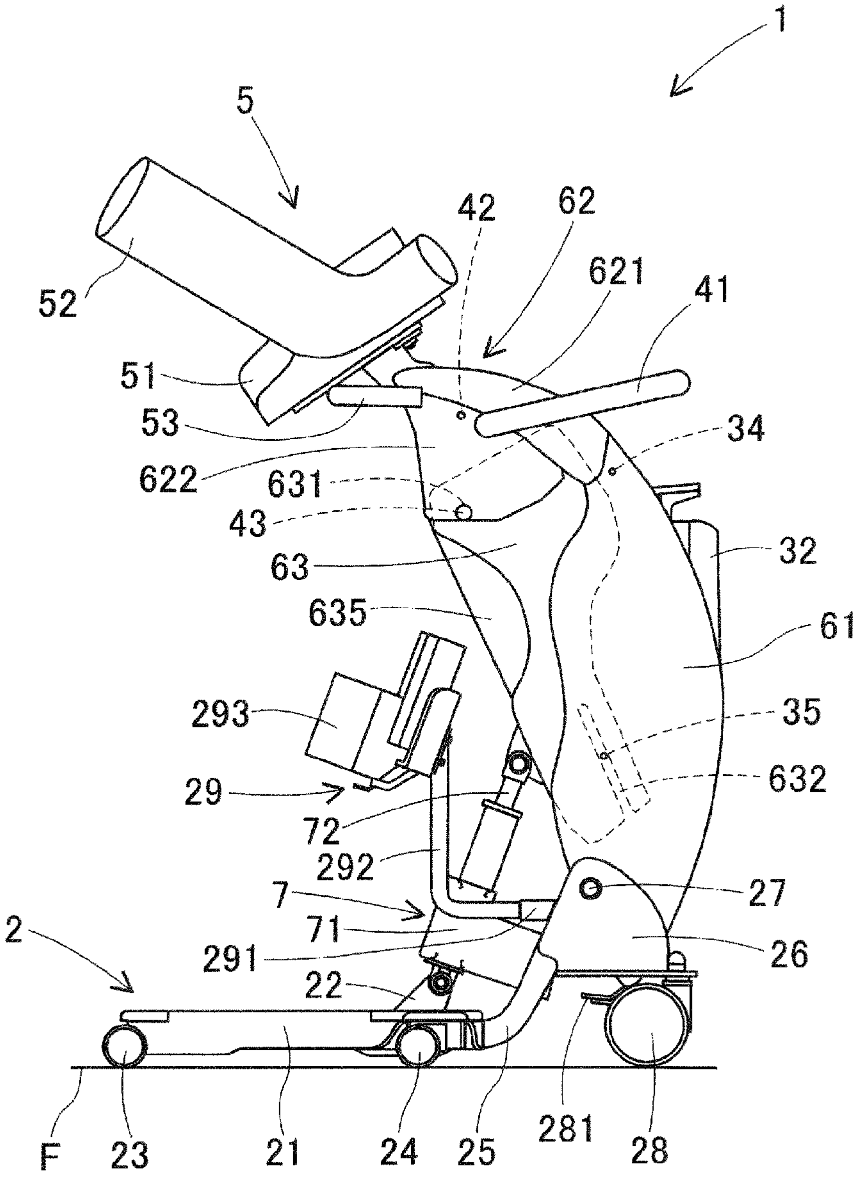
FIG. 4 is a side view showing the assistance device in an intermediate support state in which the care receiver with an intermediate posture is supported.

Next, as shown in FIG. 4, in assistance device 1 in the intermediate support state in which the care receiver with the intermediate posture is supported, lower cover supporting pin 35 is positioned in the vicinity of the intermediate depth of guide groove 632. As in the case of assistance device 1 in the initial state, first cover 61 and third cover 63 partially overlap with each other, so that a gap is not generated in a direction orthogonal to the overlapping direction. Further, second cover 62 and third cover 63 partially overlap with each other, so that a gap is not generated in a direction orthogonal to the overlapping direction.

Figure 6:
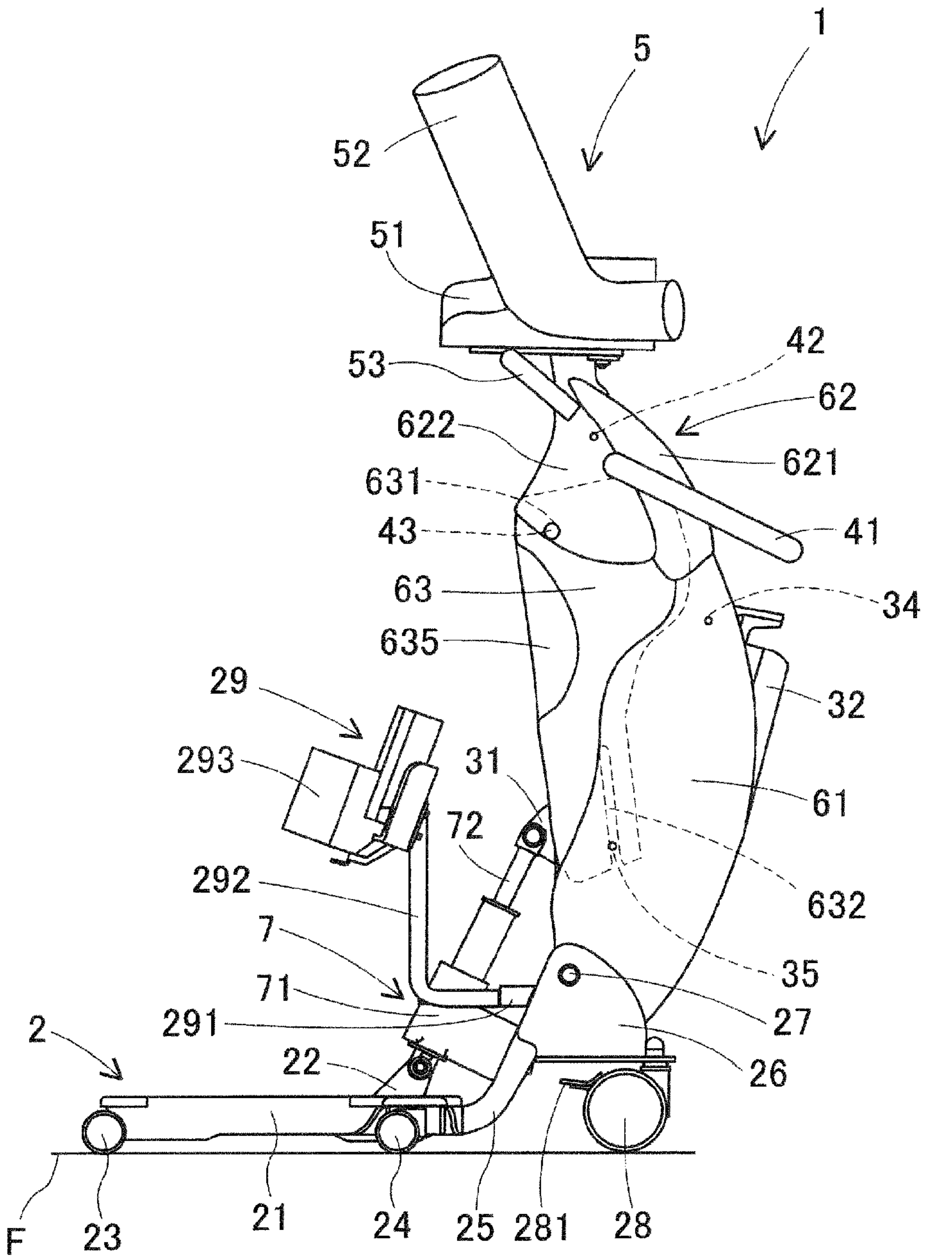
FIG. 6 is a side view showing the assistance device in a standing support state in which the care receiver with a standing posture is supported.

Further, as shown in FIG. 6, in assistance device 1 in the standing support state in which the care receiver with the standing posture is supported, lower cover supporting pin 35 is positioned in the vicinity of the opening of guide groove 632. At this time, the distance between first cover 61 and second cover 62 is greatest. Even so, first cover 61 and third cover 63 partially overlap with each other, so that a gap is not generated in a direction orthogonal to the overlapping direction. Further, second cover 62 and third cover 63 partially overlap with each other, so that a gap is not generated in a direction orthogonal to the overlapping direction.

In summary, in the entire swing range of second arm 4 with respect to first arm 3, each combination of the two sets of covers described above maintains the overlapping state. With this, a cover configuration including first cover 61, second cover 62, and third cover 63 always covers first arm 3, second arm 4, and the entire periphery of actuator 8. In addition, a gap is hardly generated or the covers come into contact with each other, at a position in which the covers overlap with each other. Therefore, there is no concern that the finger or the like of the care receiver is pinched in the movable portion or between the covers. Driving source 7 is provided at a low position in which driving source 7 is hidden by knee rest member 29, and it is difficult for the care receiver to reach, so that the necessity of covering driving source 7 is small.

Further, since the direction in which guide groove 632 is formed is appropriate, the slide movement direction of third cover 63 is made along the expansion and contraction direction of actuator 8. With this, since third cover 63 that covers actuator 8 does not protrude rearward, downsizing is possible and interference with the care receiver is restrained. If there is a large difference in angle between the slide movement direction of third cover 63 and the expansion and contraction direction of actuator 8, it is necessary to expand third cover 63 rearward to enlarge the size. In addition, the enlarged third cover 63 is likely to interfere with the care receiver.

Assistance device 1 of the first embodiment includes third cover 63, in addition to first cover 61 that covers first arm 3 and second cover 62 that covers second arm 4. Therefore, the gap can be closed by third cover 63, even in a case where second arm 4 swings with respect to first arm 3 and the gap is generated between first cover 61 and second cover 62. Accordingly, the gap is substantially eliminated, so that there is no concern that the finger or the like of the care receiver is pinched in the movable portion or between the covers. In addition, with the combination of three covers, a compact cover configuration capable of responding to the shape change of assistance device 1 is realized, and the increase in size of an assistance device 1 main body and the cover is restrained.

3. Assistance Device 9 of Second Embodiment

Figure 9:
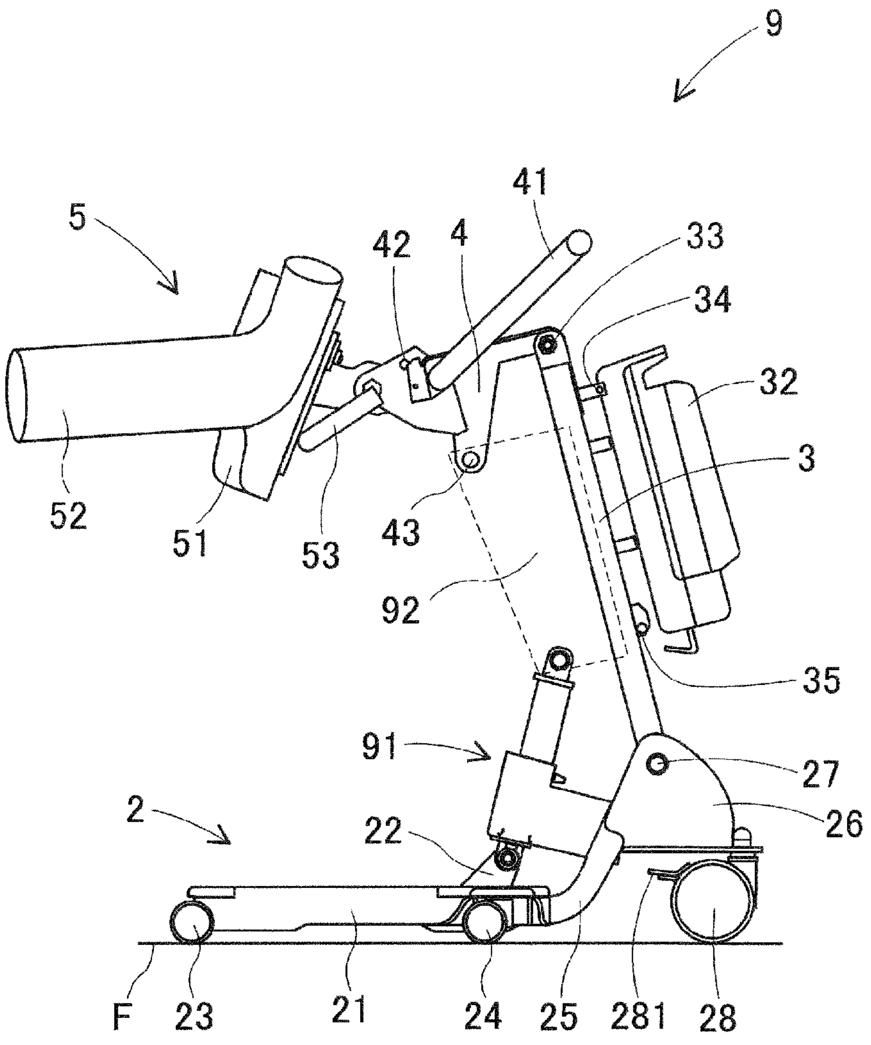
FIG. 9 is a side view showing an initial state of an assistance device of a second embodiment, in which the first to third covers and the knee rest member are omitted.

Next, assistance device 9 of a second embodiment will be described mainly in terms of points different from the first embodiment. As shown in FIG. 9, assistance device 9 of the second embodiment includes overall driving source 91 and link mechanism 92 in place of driving source 7 and actuator 8 of the first embodiment. Overall driving source 91 and link mechanism 92 are disposed behind first arm 3 and drive the swing of first arm 3 and the swing of second arm 4. A linear motion actuator can be applied to overall driving source 91. Link mechanism 92 is formed, for example, by modifying the mechanism disclosed by the applicant of the present application in International Publication No. WO2018/167856.

In the second embodiment, the same cover configuration as in the first embodiment can be applied. In the second embodiment, third cover 63 is formed in a shape that covers at least the rear side of first arm 3 and link mechanism 92. Since actions and effects in the second embodiment are the same as those in the first embodiment, descriptions thereof will be omitted.

4. Modification and Application of Embodiment

In the first and second embodiments, the aspect of third cover 63 can be variously modified. That is, when first arm 3 or first cover 61 is defined as a first member and second arm 4 or second cover 62 is defined as a second member, third cover 63 may be supported so as to be swingable around a horizontal axis with respect to a first one of the first and second members, and may be provided so as to be slidably movable with respect to a second one of the first and second members. For example, third cover 63 may be attached to first cover 61 or second cover 62 instead of first arm 3 or second arm 4. Alternatively, third cover 63 may be swingably supported by first arm 3 and may be provided so as to be slidably movable with respect to second arm 4.

Further, the guide groove may be formed on a first of third cover 63 and the second one of the first and second members, and the guide pin may be provided on a second of third cover 63 and the second one of the first and second members. For example, the guide groove may be formed on first arm 3, and the guide pin may be provided in third cover 63. The cover configuration of the first embodiment can also be applied to a configuration in which driving source 7 is not provided and first arm 3 is fixed to base 2. In addition, various modifications and applications can also be made in the first and second embodiments.

What is claimed is:

1. An assistance device that assists a care receiver in standing up, the device comprising:

a base;

a first arm extending upward from the base;

a second arm provided on the first arm and configured to swing around a first horizontal axis;

a support member provided on the second arm and configured to support an upper half body of the care receiver;

a first cover provided on the first arm and configured to cover at least a part of the first arm;

a second cover provided on the second arm and configured to cover at least a part of the second arm; and a third cover configured to be swingable around a second horizontal axis is swingably attached to the first arm or the first cover and is slidably attached to the second arm or the second cover, alternatively the third cover is swingably attached to the second arm or the second cover and is slidably attached to the first arm or the first cover.

2. The assistance device according to claim 1, wherein in a case the third cover is swingably attached to the first arm or the first cover and is slidably attached to the second arm or the second cover, a guide groove is formed on the third cover, and a guide pin is provided on the second arm or the second cover, alternatively a guide groove is formed on the second arm or the second cover, and a guide pin is provided on the third cover; and wherein in a case the third cover is swingably attached to the second arm or the second cover and is slidably attached to the first arm or the first cover, a guide groove is formed on the third cover, and a guide pin is provided on the first arm or the first cover, alternatively a guide groove is formed on the first arm or the first cover, and a guide pin is provided on the third cover, such that the guide pin is configured to move along the guide groove and the third cover.

3. The assistance device according to claim 2, wherein the guide groove is formed on the third cover, and the guide pin is provided on the first arm or the first cover.

4. The assistance device according to claim 1, wherein in an entire swing range of the second arm with respect to the first arm, the first and third covers are partially overlapped in an overlapping direction and a gap is not generated in a direction orthogonal to the overlapping direction, and the second and third covers are partially overlapped in the overlapping direction and a gap is not generated in a direction orthogonal to the overlapping direction.

5. The assistance device according to claim 1, wherein the third cover is disposed on an inner surface side of the first and second covers.

6. The assistance device according to claim 5, wherein a separation distance between the first and second covers is equal or larger than a specified distance such that a finger of the care receiver is not pinched.

7. The assistance device according to claim 1, further comprising:

an actuator configured to drive the swing of the second arm and provided behind the first arm, wherein the third cover is configured to cover at least a rear side of the first arm and the actuator.

8. The assistance device according to claim 7, wherein the actuator is a linear motion actuator bridged between a base point of the first arm and a drive point of the second arm and performs expanding or contracting, and the third cover is supported so as to be swingable around the second horizontal axis passing through the drive point.

9. The assistance device according to claim 8, wherein a slide movement direction of the third cover is along an expansion and contraction direction of the linear motion actuator.

10. The assistance device according to claim 1, wherein the first arm is provided so as to be swingable around a third horizontal axis with respect to the base, and the first cover is configured to swing integrally with the first arm with respect to the base, with the swing of the first arm.

11. The assistance device according to claim 10, further comprising:

a driving source configured to drive the swing of the first arm and provided behind the first arm, and an actuator configured to drive the swing of the second arm and provided behind the first arm, wherein the third cover is configured to cover at least a rear side of the first arm and the actuator.

12. The assistance device according to claim 1,
wherein the first arm is provided so as to be swingable around a third horizontal axis with respect to the base,
the assistance device further comprises an overall driving source and a link mechanism configured to drive the swing of the first arm and the swing of the second arm, behind the first arm, and
the third cover is configured to cover at least a rear side of the first arm and the link mechanism.

13. The assistance device according to claim 2,
wherein in an entire swing range of the second arm with respect to the first arm,
the first and third covers are partially overlapped in an overlapping direction and a gap is not generated in a direction orthogonal to the overlapping direction, and
the second and third covers are partially overlapped in the overlapping direction and a gap is not generated in a direction orthogonal to the overlapping direction.

14. The assistance device according to claim 3,
wherein in an entire swing range of the second arm with respect to the first arm,
the first and third covers are partially overlapped in an overlapping direction and a gap is not generated in a direction orthogonal to the overlapping direction, and
the second and third covers are partially overlapped in the overlapping direction and a gap is not generated in a direction orthogonal to the overlapping direction.

15. The assistance device according to claim 2,
wherein the third cover is disposed on an inner surface side of the first and second covers.

16. The assistance device according to claim 3,
wherein the third cover is disposed on an inner surface side of the first and second covers.

17. The assistance device according to claim 4,
wherein the third cover is disposed on an inner surface side of the first and second covers.

18. The assistance device according to claim 2, further comprising:
an actuator configured to drive the swing of the second arm and provided behind the first arm,
wherein the third cover is configured to cover at least a rear side of the first arm and the actuator.

19. The assistance device according to claim 3, further comprising:
an actuator configured to drive the swing of the second arm and provided behind the first arm,
wherein the third cover is configured to cover at least a rear side of the first arm and the actuator.

* * * * *